United States Patent
Ryu et al.

(10) Patent No.: US 11,927,389 B2
(45) Date of Patent: Mar. 12, 2024

(54) REFRIGERATOR APPLIANCE HAVING A WEIGHT-DETECTING SHELF ASSEMBLY

(71) Applicant: Haier US Appliance Solutions, Inc., Wilmington, DE (US)

(72) Inventors: Choon Jae Ryu, Prospect, KY (US); Michael Goodman Schroeder, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 417 days.

(21) Appl. No.: 17/173,285

(22) Filed: Feb. 25, 2021

(65) Prior Publication Data
US 2022/0268513 A1    Aug. 25, 2022

(51) Int. Cl.
*F25D 25/02* (2006.01)
*F25D 29/00* (2006.01)

(52) U.S. Cl.
CPC ........... *F25D 29/005* (2013.01); *F25D 25/02* (2013.01); *F25D 25/024* (2013.01); *F25D 25/025* (2013.01); *F25D 2500/06* (2013.01); *F25D 2700/06* (2013.01)

(58) Field of Classification Search
CPC .............. F25D 25/02; F25D 2400/361; F25D 2700/06; F25D 29/005; F25D 2500/06; F25D 25/025; F25D 25/024; G01G 5/003; G01G 5/006; G01G 5/04; G01G 19/52; G01G 19/42; A47B 96/021; A47F 5/0043; G06Q 10/087
See application file for complete search history.

(56) References Cited

U.S. PATENT DOCUMENTS

| | | | |
|---|---|---|---|
| 8,419,143 B2 | 4/2013 | Shin | |
| 9,989,298 B1 * | 6/2018 | Wantland | A47B 57/42 |
| 10,121,121 B1 * | 11/2018 | De Bonet | A47B 57/34 |
| 10,389,980 B2 | 8/2019 | Furuta | |
| 10,489,743 B2 | 11/2019 | Aepli | |
| 10,614,415 B1 * | 4/2020 | De Bonet | A47B 96/028 |
| 10,746,589 B1 * | 8/2020 | Danenberg | H05K 5/0073 |
| 11,134,222 B2 * | 9/2021 | Kim | H04N 7/181 |

(Continued)

FOREIGN PATENT DOCUMENTS

| | | |
|---|---|---|
| JP | 2012007769 A | 1/2012 |
| JP | 2019070478 A | 5/2019 |

(Continued)

OTHER PUBLICATIONS

English translation JP2019070478A (Year: 2019).*

*Primary Examiner* — Hiwot E Tefera
(74) *Attorney, Agent, or Firm* — Dority & Manning, P.A.

(57) ABSTRACT

A refrigerator appliance may include a cabinet, a door, an image module, and a shelf assembly. The cabinet may define a chilled chamber. The door may be rotatably hinged to the cabinet to provide selective access to the chilled chamber. The image module may be mounted to the cabinet. The shelf assembly may be disposed below the image module within the chilled chamber. The shelf assembly may include a support panel attached to the cabinet, a first shelf attached to the support panel, a second shelf attached to the support panel and spaced apart from the first shelf, and a weight sensor mounted on the support panel to detect stored mass at the first shelf and the second shelf.

20 Claims, 7 Drawing Sheets

(56) References Cited

U.S. PATENT DOCUMENTS

| | | | |
|---|---|---|---|
| 11,353,259 B2* | 6/2022 | Jeong | G06F 3/167 |
| 2009/0255292 A1* | 10/2009 | Benz | A47B 57/06 |
| | | | 700/275 |
| 2013/0257253 A1* | 10/2013 | Haltmeyer | F25D 25/025 |
| | | | 312/404 |
| 2014/0224875 A1* | 8/2014 | Slesinger | A47F 5/0043 |
| | | | 439/38 |
| 2016/0048798 A1* | 2/2016 | Meyer | G01G 19/42 |
| | | | 705/28 |
| 2017/0039511 A1* | 2/2017 | Corona | G06Q 30/0633 |
| 2017/0249587 A1* | 8/2017 | Jones | G06Q 10/087 |
| 2018/0080702 A1* | 3/2018 | Wilson | F25D 17/065 |
| 2020/0072659 A1* | 3/2020 | Bühlmeyer | G01G 19/42 |
| 2021/0030169 A1* | 2/2021 | Zhai | G01G 19/52 |
| 2022/0252338 A1* | 8/2022 | Ryu | F25D 25/025 |

FOREIGN PATENT DOCUMENTS

| | | |
|---|---|---|
| JP | 2019219110 A | 12/2019 |
| KR | 20140127590 | 11/2014 |

\* cited by examiner

REFRIGERATOR APPLIANCE HAVING A WEIGHT-DETECTING SHELF ASSEMBLY

FIELD OF THE INVENTION

The present subject matter relates generally to refrigerator appliances, and more particularly to refrigerator appliances having features for detecting the weight of items on a shelf assembly.

BACKGROUND OF THE INVENTION

Storage enclosures, such as refrigerator appliances and pantries, generally provide an enclosed chamber for receiving multiple items or objects. For example, refrigerator appliances generally include a cabinet that defines a chilled chamber. A user can place food items or objects within the chilled chamber in order to hinder perishing of such food items. Thereby, a useable life of perishable items or objects can be increased.

Over time, a large volume or number of stored items (e.g., food items) can accumulate within the refrigerator's chilled chamber. As stored items accumulate, users of the refrigerator appliance can have difficulty identifying the items located within the refrigerator appliance. Additionally, users can have difficulty determining a quantity of certain items within the refrigerator appliance. This is especially true when multiple users add/remove items from a common refrigerator appliance without communicating with other users. Consequently, the users may accidentally purchase undesired items or fail to purchase items that are nearly finished. For instance, items, such as liquids or produce, are stored within containers that are difficult for a user to see inside. Such items may be used irregularly and partially so that the entire contents of a container are only emptied after multiple uses. Additionally or alternatively, some users may be unaware that certain items have been removed or consumed. As a result, a user may be unable to determine when the container is nearly empty and in need of replacing.

Some existing appliances have attempted to address these issues by requiring a user to manually input each item being stored. Other appliances have used various methods, such as scales, to estimate or guess the quantity or identification of items being stored. Nonetheless, such attempts have been insufficiently cumbersome or expensive. For instance, typical scales are only able to determine the weight of the particular shelf or area of a shelf. As a result, the complexity and cost associated with detecting the weight of multiple shelves is significant. Moreover, even once a weight is detected, conventional systems require a user to manual input or know what items are being weighed, which can be difficult or cumbersome.

Accordingly, a refrigerator appliance with features for assisting a user with tracking contents of a chilled chamber of the refrigerator appliance would be useful. In particular, a refrigerator appliance with features for assisting a user with accurately tracking the amount or volume of contents of a chilled chamber of the refrigerator appliance across multiple shelves (e.g., without significantly complicating assembly or operation) would be useful.

BRIEF DESCRIPTION OF THE INVENTION

Aspects and advantages of the invention will be set forth in part in the following description, or may be obvious from the description, or may be learned through practice of the invention.

In one exemplary aspect of the present disclosure, a refrigerator appliance is provided. The refrigerator appliance may include a cabinet, a door, an image module, and a shelf assembly. The cabinet may define a chilled chamber. The door may be rotatably hinged to the cabinet to provide selective access to the chilled chamber. The image module may be mounted to the cabinet. The shelf assembly may be disposed below the image module within the chilled chamber. The shelf assembly may include a support panel attached to the cabinet, a first shelf attached to the support panel, a second shelf attached to the support panel and spaced apart from the first shelf, and a weight sensor mounted on the support panel to detect stored mass at the first shelf and the second shelf.

In another exemplary aspect of the present disclosure, a refrigerator appliance is provided. The refrigerator appliance may include a cabinet, a door, an image module, and a shelf assembly. The cabinet may define a chilled chamber. The door may be rotatably hinged to the cabinet to provide selective access to the chilled chamber. The image module may be mounted to the cabinet. The shelf assembly may be disposed below the image module within the chilled chamber. The shelf assembly may include a support panel attached to the cabinet, a first shelf attached to the support panel, a second shelf attached to the support panel and vertically spaced apart from the first shelf, and a weight sensor mounted on the support panel rearward from the first shelf and the second shelf at a rear portion of the chilled chamber to detect stored mass at the first shelf and the second shelf.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the term "or" is generally intended to be inclusive (i.e., "A or B" is intended to mean "A or B or both"). The terms "first," "second," and "third" may be used interchangeably to distinguish one component from another and are not intended to signify location or importance of the individual components.

Figure 1:
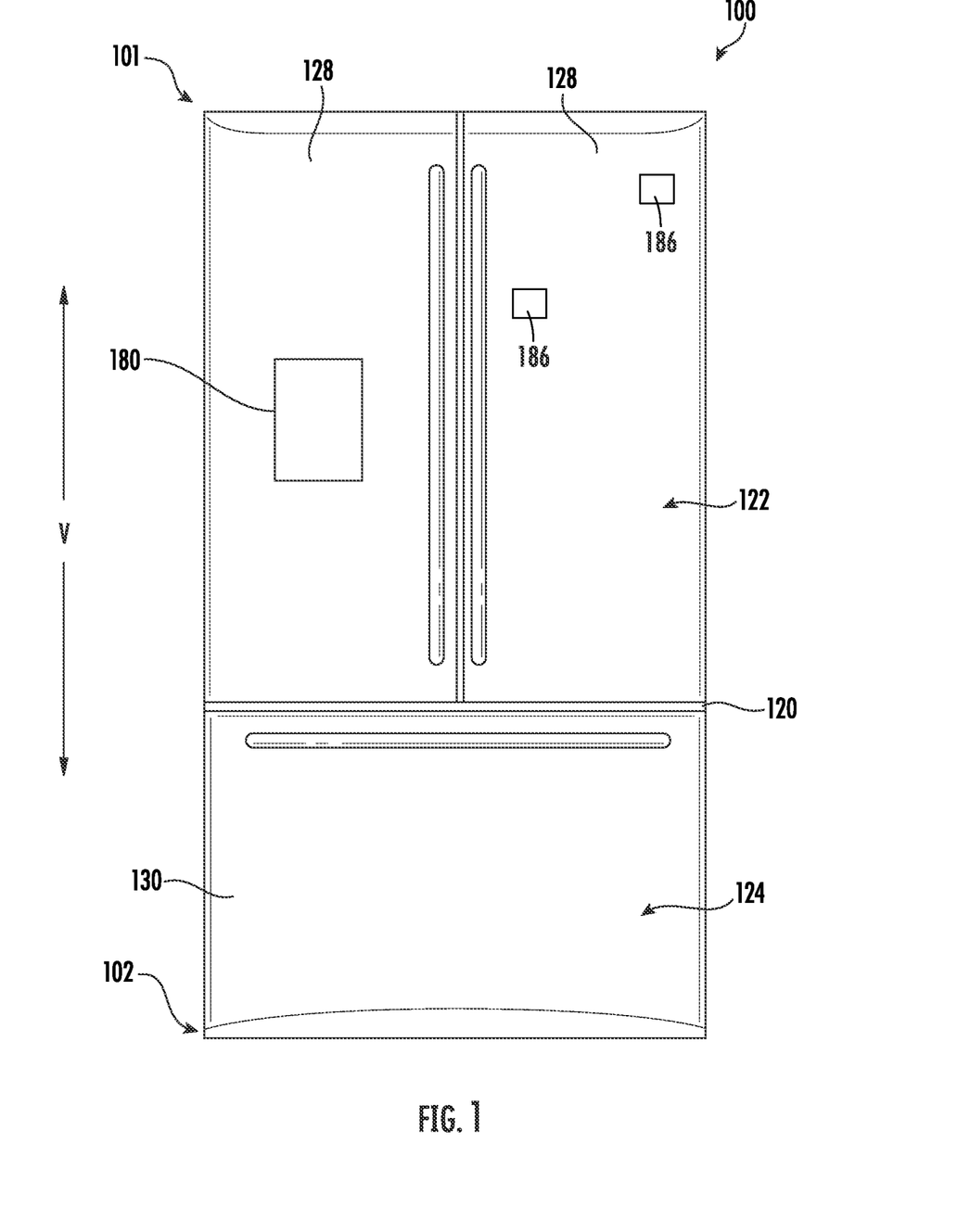
FIG. 1 provides a front elevation view of a refrigerator appliance according to exemplary embodiments of the present disclosure.
Figure 2:
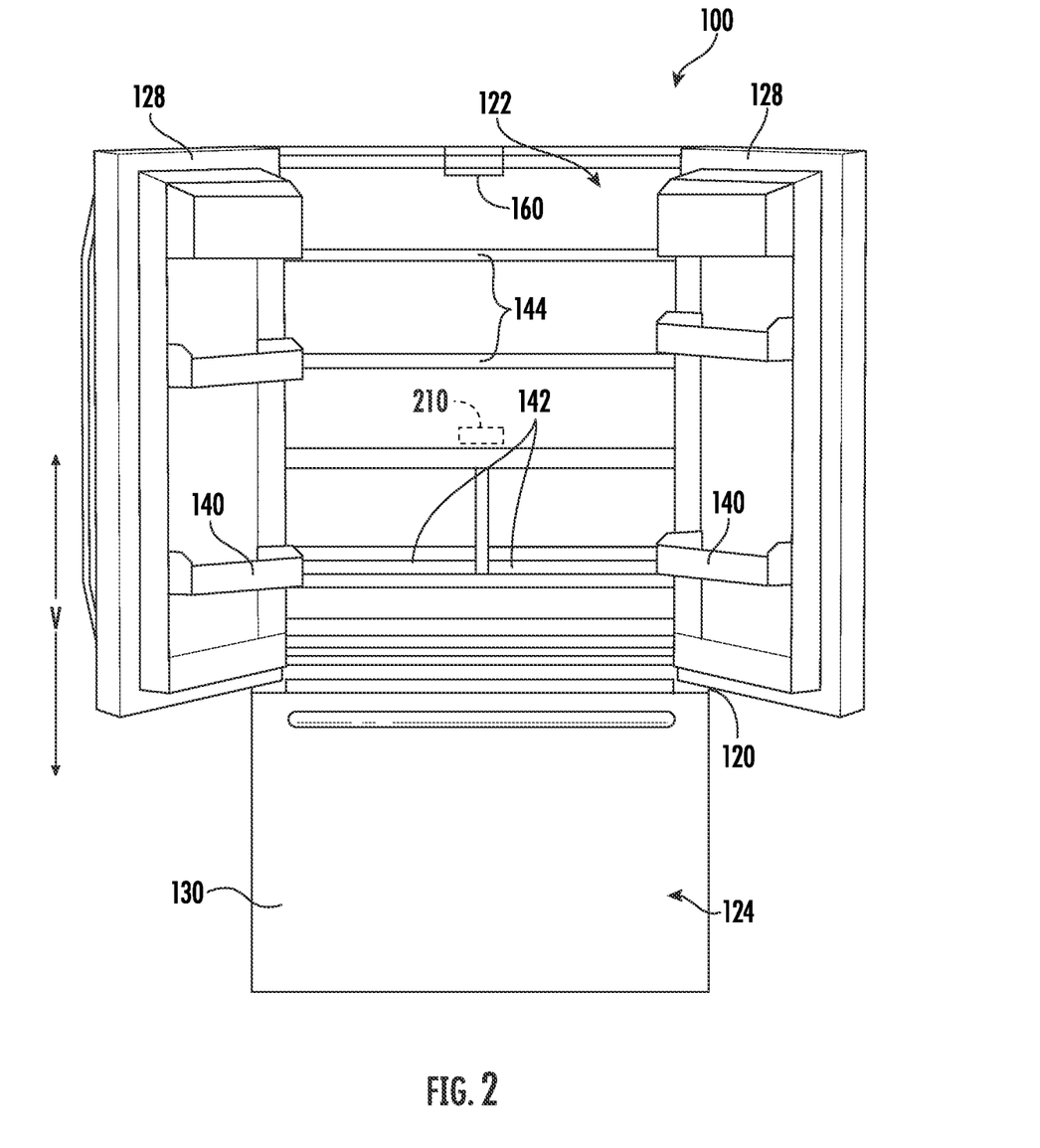
FIG. 2 provides a front elevation view of a refrigerator appliance according to exemplary embodiments of the present disclosure, wherein refrigerator doors are shown in an open position.

Turning now to the figures, FIG. 1 provides a front elevation view of a refrigerator appliance 100 according to exemplary embodiments of the present disclosure with refrigerator doors 128 of the refrigerator appliance 100 shown in a closed position. FIG. 2 provides a front view elevation of refrigerator appliance 100 with refrigerator doors 128 shown in an open position to reveal a fresh food chamber 122 of refrigerator appliance 100.

Refrigerator appliance 100 includes a housing or cabinet 120 that extends between a top and a bottom 102 along a vertical direction V. Cabinet 120 defines chilled chambers for receipt of food items for storage. In particular, cabinet 120 defines fresh food chamber 122 positioned at or adjacent top of cabinet 120 and a freezer chamber 124 arranged at or adjacent bottom 102 of cabinet 120. As such, refrigerator appliance 100 is generally referred to as a bottom mount refrigerator. It is recognized, however, that the benefits of the present disclosure apply to other types and styles of storage enclosure, such as a top mount refrigerator appliance, a side-by-side style refrigerator appliance, or an unrefrigerated pantry enclosure. Consequently, the description set forth herein is for illustrative purposes only and is not intended to be limiting in any aspect to any particular storage enclosure or refrigerator chamber configuration.

Refrigerator doors 128 are rotatably hinged to an edge of cabinet 120 for selectively accessing fresh food chamber 122. In addition, a freezer door 130 is arranged below refrigerator doors 128 for selectively accessing freezer chamber 124. Freezer door 130 is coupled to a freezer drawer 142 (not shown) slidably mounted within freezer chamber 124. As discussed above, refrigerator doors 128 and freezer door 130 are shown in the closed configuration in FIG. 1, and refrigerator doors 128 are shown in the open position in FIG. 2.

Turning now to FIG. 2, various storage components are mounted within fresh food chamber 122 to facilitate storage of food items therein as will be understood by those skilled in the art. In particular, the storage components include bins 140, drawers 142, and shelves 144 that are mounted within fresh food chamber 122. Bins 140, drawers 142, and shelves 144 are configured for receipt of stored items (e.g., beverages or solid food items) and may assist with organizing such food items. As an example, drawers 142 can receive fresh food items (e.g., vegetables, fruits, or cheeses) and increase the useful life of such fresh food items. As will be described in greater detail below, one or more shelves 144 or drawers 142 may be included with or as part of a shelf assembly 200 mounted to an inner liner of fresh food chamber 124.

Refrigerator appliance 100 also includes features for assisting a user with identifying food items positioned within fresh food chamber 122 or freezer chamber 124. The user can utilize such features, for example, to view food items stored (i.e., stored items) within fresh food chamber 122 or freezer chamber 124 or create an inventory of such stored items. Such features are discussed in greater detail below.

Figure 3:
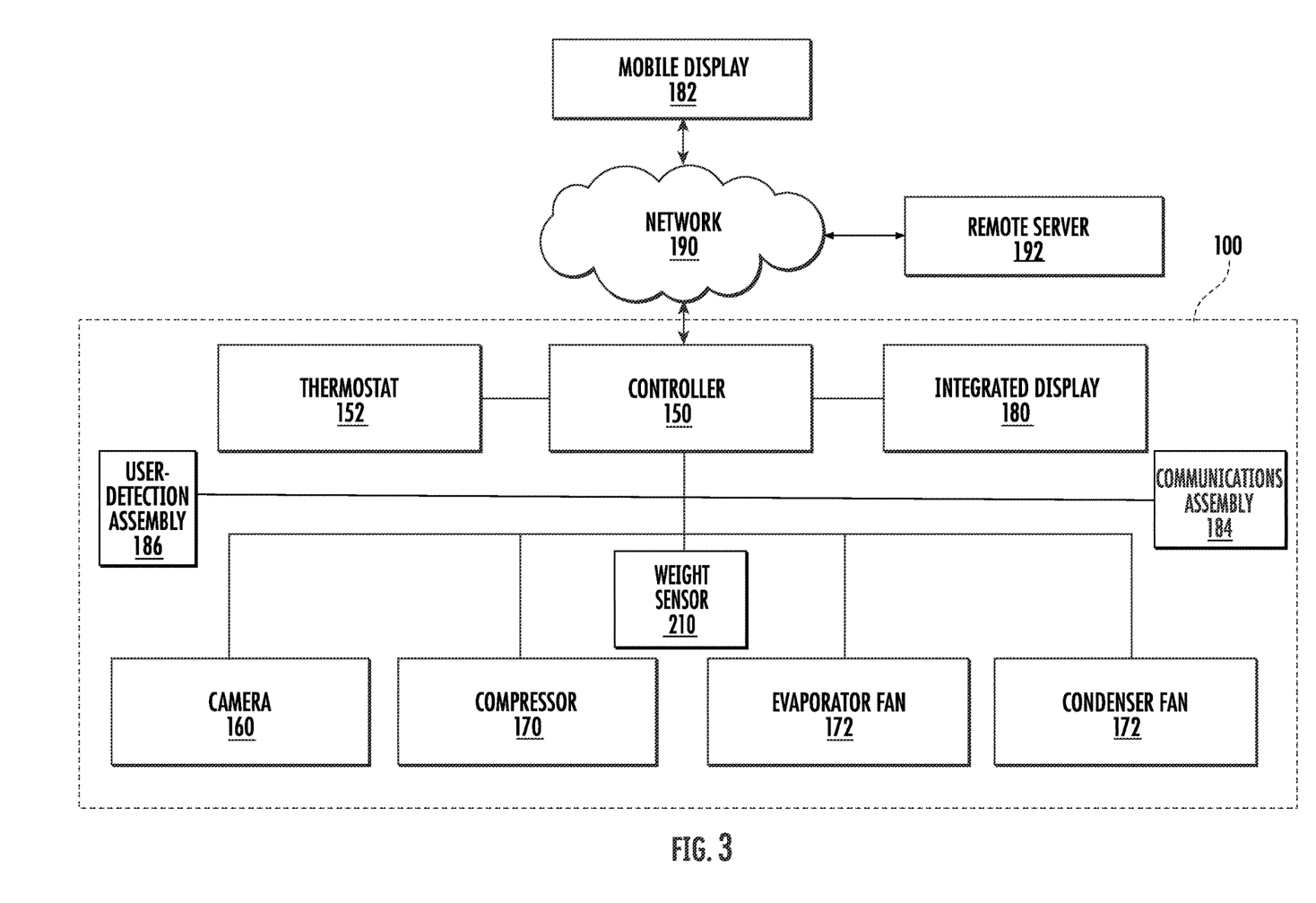
FIG. 3 provides a schematic view of a refrigerator appliance according to exemplary embodiments of the present disclosure.

FIG. 3 provides a schematic view of refrigerator appliance 100. Refrigerator appliance 100 includes a controller 150 that is operatively coupled or in communication with components of a refrigeration system (not shown) of refrigerator appliance 100 configured for cooling fresh food chamber 122 or freezer chamber 124. The components include a compressor 170, an evaporator fan 172, and a condenser fan 174. Controller 150 can selectively operate such components in order to cool fresh food chamber 122 or freezer chamber 124. Controller 150 is also in communication with a thermostat (e.g., a thermocouple or thermistor). The thermostat may be positioned in fresh food compartment 122 or freezer compartment 124 (FIG. 2). Controller 150 may receive a signal from the thermostat that corresponds to a temperature of fresh food compartment 122 or freezer compartment 124. Controller 150 may also include an internal timer for calculating elapsed time periods.

Controller 150 may include a memory and one or more microprocessors, CPUs or the like, such as general or special purpose microprocessors operable to execute programming instructions or micro-control code associated with operation of refrigerator appliance 100. The memory may represent random access memory such as DRAM, or read only memory such as ROM or FLASH. In some embodiments, the processor executes non-transitory programming instructions stored in memory. For certain embodiments, the instructions include a software package configured to operate appliance 100 or execute an operation routine. The memory may be a separate component from the processor or may be included onboard within the processor. Alternatively, controller 150 may be constructed without using a microprocessor (e.g., using a combination of discrete analog or digital logic circuitry; such as switches, amplifiers, integrators, comparators, flip-flops, AND gates, and the like) to perform control functionality instead of relying upon software.

Controller 150 may be positioned in a variety of locations throughout refrigerator appliance 100. Input/output ("I/O") signals may be routed between controller 150 and various operational components of refrigerator appliance 100. One or more components of refrigerator appliance 100 may be in communication (e.g., electric communication) with controller 150 via one or more conductive signal lines or shared communication busses. Additionally or alternatively, one or more components of refrigerator appliance 100 may be in communication (e.g., wireless communication) with controller 150 via one or more wireless signal bands.

In some embodiments, refrigerator appliance 100 also includes a camera or image module 160. Image module 160 may be any type of device suitable for capturing a two-dimensional picture or image. As an example, image module 160 may be a video camera or a digital camera with an electronic image sensor [e.g., a charge coupled device (CCD) or a CMOS sensor]. As an additional or alternative example, image module 160 may include a pressure-sensing mat including a plurality of pressure detection cells to detect the relative variations in pressure, as would be understood. The pressure-sensing mat may be disposed on one or more shelves 144 (or shelves 224—FIGS. 4 through 7) and, optionally, be formed from a substantially transparent material. Thus, the pressure-sensing mat may detect one or more objects placed on the corresponding shelf or shelves 144. Moreover, a two-dimensional image (e.g., of the footprint for one or more objects placed on the corresponding shelf 144) may be assembled using the signals received from the pressure-sensing mat. As a further additional or alternative example, image module 160 may include a beam-emission sensor (e.g., lidar, radar, etc.) to detect objects within a line of sight or transmission of the sensor, as would be understood.

When assembled, image module 160 is in communication (e.g., electric or wireless communication) with controller 150 such that controller 150 may receive a signal from image module 160 corresponding to the image captured by image module 160.

Generally, image module 160 is positioned on refrigerator appliance 100. In some embodiments, image module 160 is mounted within fresh food chamber 122 at a top portion thereof (e.g., adjacent the top). For instance, image module 160 may be fixed to or directed through a top wall of an internal liner defining fresh food chamber 122. In such embodiments, image module 160 may be directed downward, as illustrated in FIG. 2.

In certain embodiments, image module 160 is directed toward one or more chilled chamber (e.g., fresh food chamber 122—FIG. 2). For instance, image module 160 may be directed towards at least a portion of any particular one of or combination of drawers 142 and shelves 144 (FIG. 2). Thus, in some such embodiments, image module 160 can capture images of one of drawers 142, all of drawers 142, one of shelves 144, all of shelves 144, or any suitable combination thereof.

Although image module 160 is illustrated as being mounted within fresh food chamber 122, it is understood that additional or alternative embodiments include a camera or image module [e.g., digital camera with an electronic image sensor, such as a charge coupled device (CCD) or a CMOS sensor; a pressure-sensing mat; a beam emitting sensor; etc.] mounted at another suitable portion of refrigerator appliance, such as a door 128. Such a camera assembly may be directed outward or in front of refrigerator appliance 100 and may thus capture images of a user or area positioned forward from refrigerator appliance 100 (e.g., when the corresponding door is in a closed position).

In certain embodiments, refrigerator appliance 100 includes an integrated display 180. Integrated display 180 may be mounted on refrigerator door 128 (FIG. 1) or at any other suitable location on refrigerator appliance 100. Integrated display 180 is in communication with controller 150 such that integrated display 180 may receive a signal from controller 150 corresponding to an image captured by image module 160. Integrated display 180 can receive such signal from controller 150 and present the image to a user visually. Integrated display 180 may include, for example, a liquid crystal display panel (LCD), a plasma display panel (PDP), or any other suitable mechanism for displaying an image (e.g., a projector).

Separate from or in addition to integrated display 180, refrigerator 100 may include a communications assembly 184 in communication with controller 150. Generally, communications assembly 184 may be mounted on any suitable portion of refrigerator 100, such as within cabinet 120 or a door 128. In certain embodiments, the communications assembly includes a loudspeaker (e.g., dynamic loudspeaker, electrostatic loudspeaker, planar magnetic loudspeaker, piezoelectric loudspeaker etc.). As is understood, the loudspeaker may be configured to generate soundwaves from one or more electrical signals (e.g., digital sound signals received from controller 150). The loudspeaker may thus audibly communicate information to a user. In additional or alternative embodiments, the communications assembly includes a microphone (e.g., dynamic microphone, ribbon microphone, fiber-optic microphone, piezoelectric microphone, etc.). As is understood, the microphone may generate one or more electrical signals (e.g., to be received by controller 150) from one or more received soundwaves (e.g., from a user). The microphone may thus receive audible prompts or commands from a user that can be directed to the controller 150.

In exemplary embodiments, refrigerator appliance 100 includes a network interface (not shown) that couples refrigerator appliance 100 (e.g., controller 150) to a network 190 such that refrigerator appliance 100 can transmit and receive information over network 190. Network 190 can be any wired or wireless network such as a WAN, LAN, or HAN.

In optional embodiments, refrigerator appliance 100 includes a user-detection assembly 186. Generally, user-detection assembly 186 includes one or more sensors configured to detect a biometric or personalized marker corresponding to a specific individual user. As an example, user-detection assembly 186 may include a forward-facing camera configured to recognize or identify a user's face based on a captured two-dimensional image. As another example, user-detection assembly 186 may include a fingerprint imaging sensor configured to visually detect a user's fingerprint. As yet another example, user-detection assembly 186 may include a signal-detection sensor configured to detect a device address over a wireless communications band (e.g., a BLE band using short-wavelength UHF radio waves in the ISM band from 2.4 to 2.485 GHz). The device address may be a programmed Bluetooth address of, for instance, mobile display 182. The user-detection assembly 186 may thus determine if and when a mobile display 182 is within close proximity to refrigerator appliance 100.

In certain embodiments, image module 160 is included as part of user-detection assembly 186. As an example, user-detection assembly 186 may be configured to recognize or identify a user from a two-dimensional image captured at image module 160. In some such embodiments, controller 150 is further configured to recognize one or more defining features below a user's elbow, such as skin tone, arm/hand size, jewelry, typical clothing, etc. As is understood, recognizing such defining features may be performed by edge matching, divide-and-conquer search, greyscale matching, histograms of receptive field responses, or another suitable routine (e.g., executed at the controller 150 based on one or more captured images from image module 160).

During use, such as during an image capture sequence, image module 160 may capture one or more two-dimensional images (e.g., as a video feed or series of sequential static images) that may be transmitted to the controller 150 (e.g., as a data signal), as is generally understood. Optionally, the image capture sequence may be initiated by a predetermined user action, such as opening a door 128, detected movement within a chilled chamber (e.g., fresh food chamber 122), engaging or moving within range of user-detection assembly 186, proving a user input at communications assembly 184 or integrated display 180, etc.

One or more weight sensors 210 may be further provided within fresh food chamber 122 or freezer chamber 124, as will be described in greater detail below. Generally, weight sensor 210 is provided as or includes any suitable electronic load sensor or cell configured to generate one or more electronic signals according (e.g., in proportion to) a load thereon. For instance, weight sensor 210 may include a suitable strain gauge, force sensitive resistor, capacitance sensor, hydraulic sensor, or pneumatic sensor—as would be understood.

In some embodiments, one or more remote servers 192, such as a web server, is in operable communication with controller 150. The remote server 192 can be used to host a retailer's point of sale system. In other words, remote server 192 may be or include a retailer point of sale server that tracks, for example, an identifier and quantity of purchased items, a time or date stamp of purchased items, pricing of purchased items, a customer identifier (i.e., an identifier of the purchasing customer), etc. Additionally or alternatively, the remote server 192 can be used to host a retailer's stock management system. In other words, remote server 192 may include, or be provided as, a retailer stock management server that tracks, for example, stocking data relating to items offered for sale by a retailer (e.g., expiration data, location data, cost data, etc.). Also additionally or alternatively, the remote server 192 can be used to host one or more information databases.

The remote server 192 can be implemented using any suitable computing device(s). The remote server 192 may include one or more processors and one or more memory devices (i.e., memory). The one or more processors can be any suitable processing device (e.g., a processor core, a microprocessor, an ASIC, a FPGA, a microcontroller, etc.) and can be one processor or a plurality of processors that are operatively connected. The memory device can include one or more non-transitory computer-readable storage mediums, such as RAM, ROM, EEPROM, EPROM, flash memory devices, magnetic disks, etc., and combinations thereof. The memory devices can store data and instructions which are executed by the processor to cause remote server 192 to perform operations. For example, instructions could be instructions for receiving/transmitting point of sale data signals, receiving/transmitting inventory management data signals, receiving/transmitting data signals relating to a stored item, etc.

The memory devices may also include data, such as point of sale data, customer identification data, inventory data, expiration data, etc., that can be retrieved, manipulated, created, or stored by processor. The data can be stored in one or more databases. The one or more databases can be connected to remote server 192 by a high bandwidth LAN or WAN, or can also be connected to remote server 192 through network 502. The one or more databases can be split up so that they are located in multiple locales.

Remote server 192 includes a network interface such that remote server 192 can connect to and communicate over one or more networks (e.g., network 190) with one or more network nodes. In turn, remote server 192 can exchange data with one or more nodes over the network 190. In particular, remote server 192 can exchange data with controller 150. Although not pictured, it is understood that remote server 192 may further exchange data with any number of client devices over the network 190 (e.g., mobile display 182).

Turning now generally to FIGS. 4 through 7, various views of exemplary embodiments of a shelf assembly 200 are provided. As shown, shelf assembly 200 includes a support panel 212 and multiple shelves 224 (e.g., included with or as shelves 144—FIG. 2), along with weight sensor 210.

Support panel 212 itself may provide a rigid frame extending along the vertical direction V between a top panel end 230 and a bottom panel end 232, along the lateral direction L between a first panel side 234 and a second panel side 236, and along the transverse direction T between a front panel end and a rear panel end. When assembled, support panel 212 may be attached to cabinet 120, such as at a rear portion of fresh food chamber 122. In some embodiments, support panel 212 is mounted on or as part of an inner liner of fresh food chamber 122. In the illustrated embodiments, support panel 212 is mounted to a rear wall 240 of the inner liner (e.g., via one or more mechanical fasteners, adhesives, etc.). Thus, the rear panel end may be directed away from the fresh food chamber 122 while the front panel end is directed toward fresh food chamber 122.

As shown, multiple spaced apart shelves 224 may be attached to support shelf panel 212 (e.g., forward from support panel 212 such that support panel 212 is disposed rearward from one or more shelves 224). When assembled, two or more shelves 224 may be spaced apart along the vertical direction V. Additionally or alternatively, two or more shelves 224 may be spaced apart along the lateral direction L. As a result, multiple surface planes may be defined to receive stored items thereon. In some embodiments, one or more of the shelves 224 may be selectively or movably mounted such that the height or lateral side at which at least one shelf 224 is held on support panel 212 may be varied (e.g., to accommodate stored items of various sizes or shapes within the fresh food chamber 122). Optionally, a plurality of mounting rails 242 may be secured to support panel 212 to selectively attach one or more shelves 224. For instance, the mounting rails 242 may be fixed to support panel 212 while one or more shelves 224 may move relative to mounting rails 242 (e.g., as directed by a user). In some such embodiments, the mounting rails 242 define a plurality of discrete heights at which the first shelf 224 or the second shelf 224 may be attached. The discrete heights may be provided, as an example, by corresponding holes or grooves on which a mating hook of a shelf 224 may be hung or held.

Figure 4:
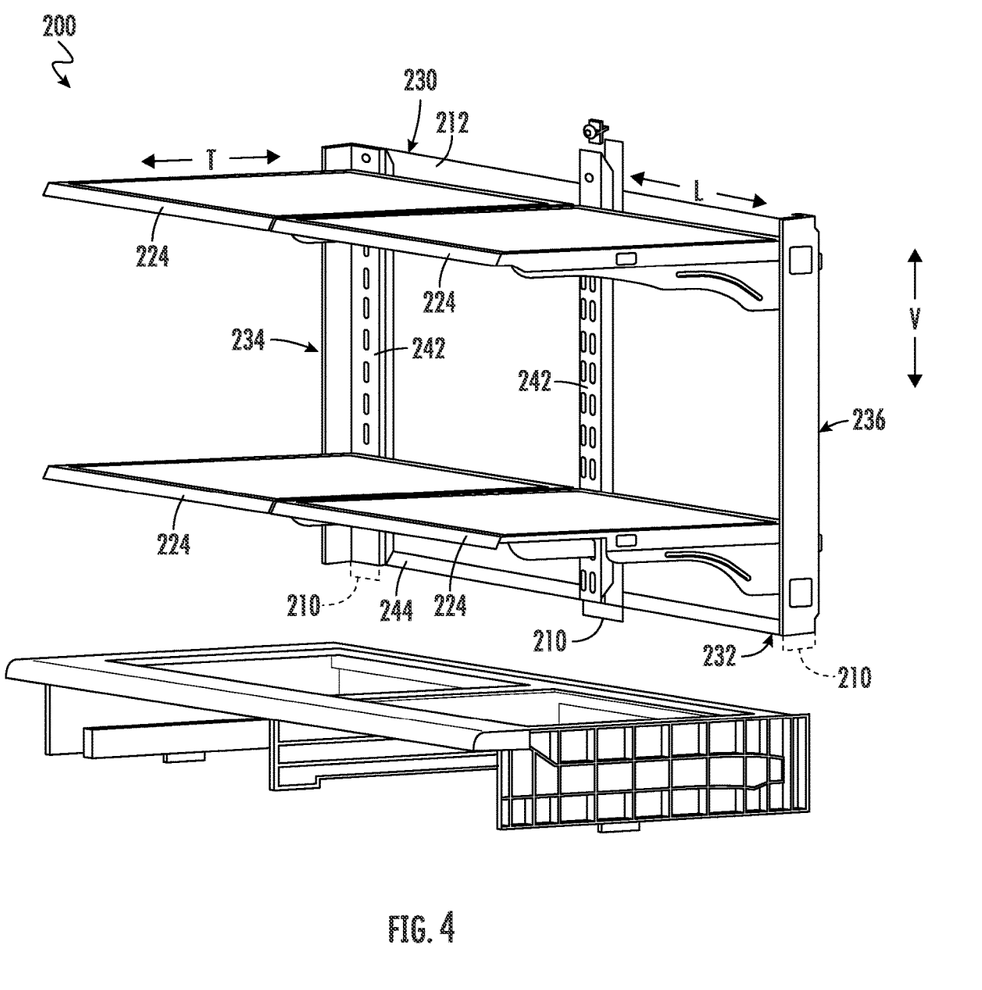
FIG. 4 provides a perspective view of a portion of a shelf assembly of a refrigerator appliance according to exemplary embodiments of the present disclosure.
Figure 5:
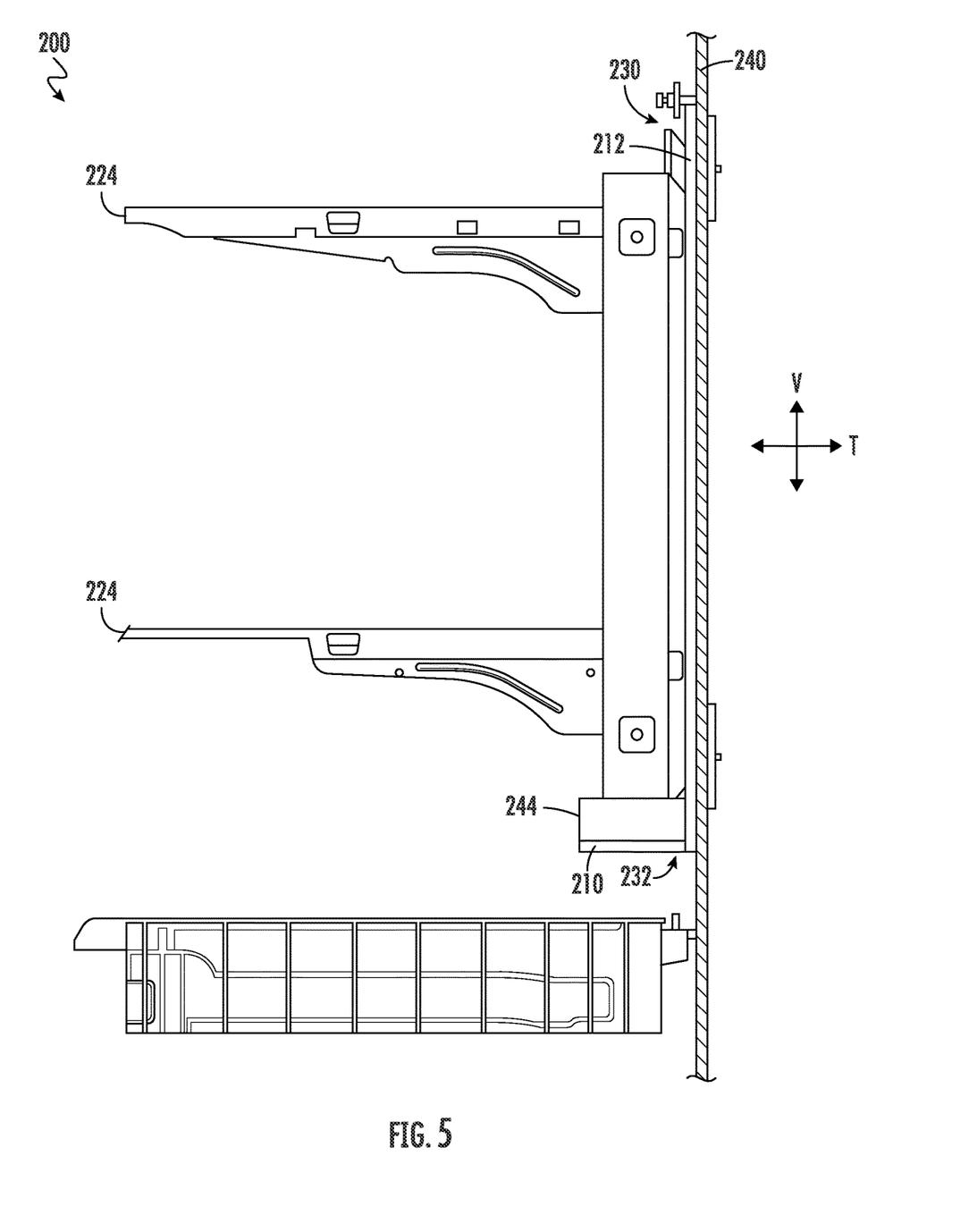
FIG. 5 provides a side elevation view of the exemplary shelf assembly of FIG. 4.

Turning especially to FIGS. 4 and 5, weight sensor 210 may be mounted on support panel 212 apart from one or more (e.g., all) of the shelves 224. In certain embodiments, weight sensor 210 is disposed below the shelves 224. Specifically, weight sensor 210 may be mounted at bottom panel end 232 or rear panel end. A bottom lip or flange 244 may be disposed above (e.g., directly above) weight sensor 210 and span support panel 212 from first panel side 234 to second panel side 236 to further transfer weight across support panel 212 to weight sensor 210. Optionally, at least one weight sensor 210 may be centrally mounted between first panel side 234 and second panel side 236. Advantageously, weight sensor 210 may detect a mass load across multiple discrete shelves 224 (e.g., proximal to opposite panel sides). Additionally or alternatively, one or more additional weight sensors 210 may be disposed proximal to first panel side 234 or second panel side 236, as indicated in phantom lines in FIG. 4. Thus, one weight sensor 210 may be mounted proximal to first panel side 234 (i.e., distal to second panel side 236) while another weight sensor 210 is mounted proximal to second panel side 236 (i.e., distal to first panel side 234). Both or all weight sensors 210 may be mounted at a common height or plane on support panel 212 (e.g., beneath flange 244).

Figure 6:
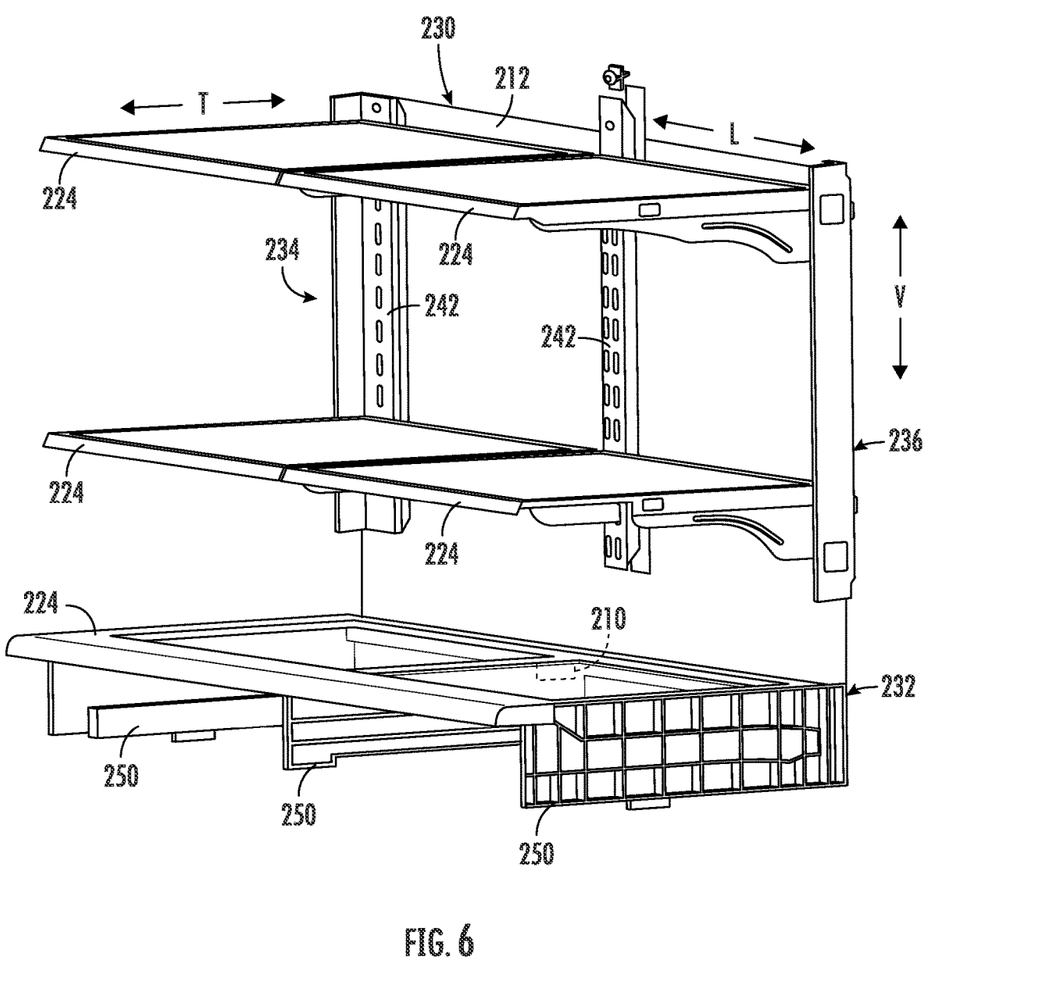
FIG. 6 provides a perspective view of a portion of a shelf assembly of a refrigerator appliance according to exemplary embodiments of the present disclosure.
Figure 7:
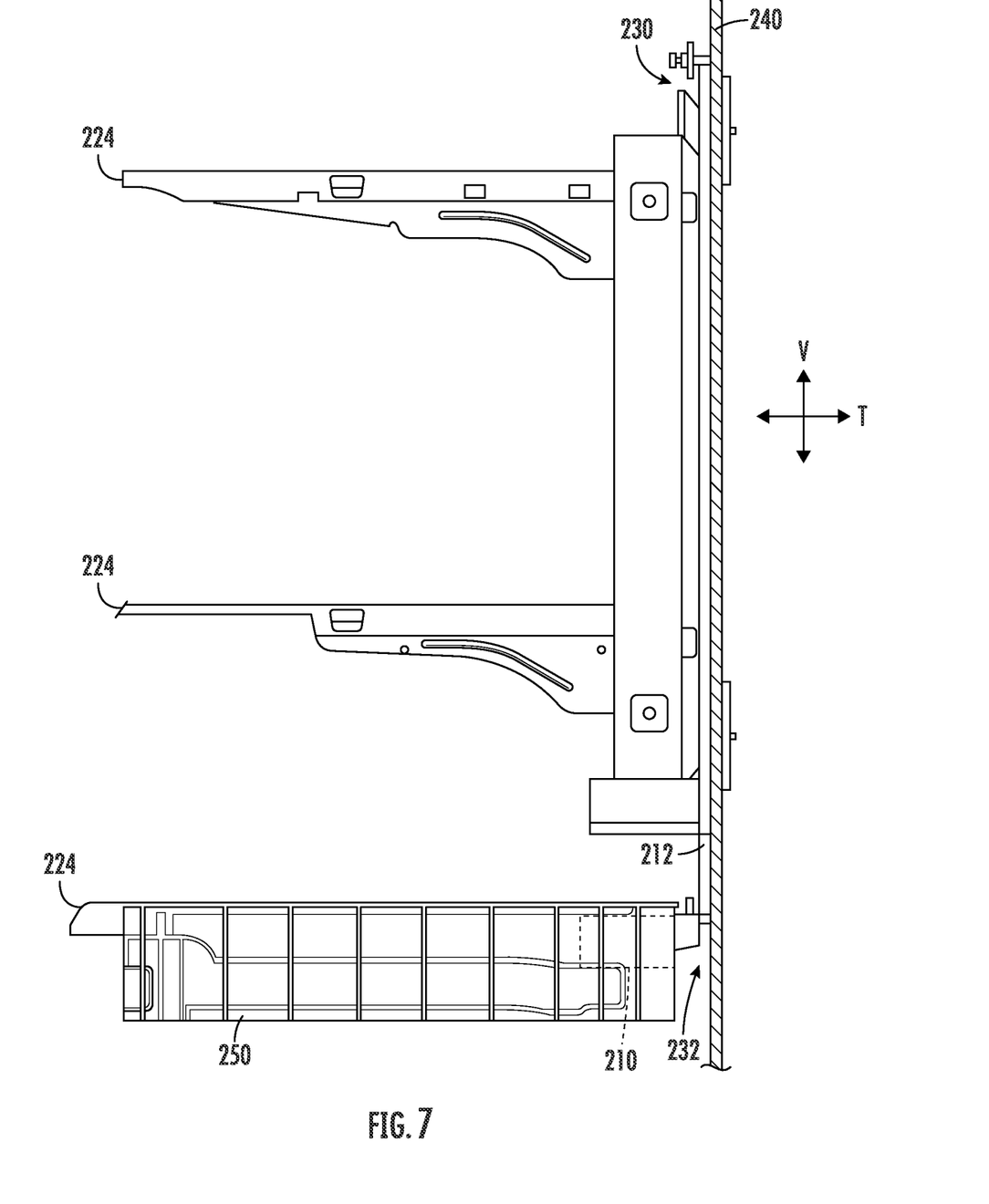
FIG. 7 provides a side elevation view of the exemplary shelf assembly of FIG. 6.

Turning now especially to FIGS. 6 and 7, weight sensor 210 may be mounted on support panel 212 apart from one or more (e.g., all) of the shelves 224. In certain embodiments, weight sensor 210 is disposed below the shelves 224. Specifically, weight sensor 210 may be mounted at bottom panel end 232 or rear panel end. A bottommost shelf 248 of support panel 212 may be disposed above (e.g., directly above) weight sensor 210 and span support panel 212 from first panel side 234 to second panel side 236 to further transfer weight across support panel 212 to weight sensor 210. In additional or alternative embodiments, the bottom-most shelf 248 includes or is attached to one or more slide brackets 250 for receiving a sliding storage drawer 142 (FIG. 2). In turn, the one or more slide brackets 250 may be mounted to support panel 212 (e.g., via bottommost shelf 248). Moreover, storage drawer 142 may be slidably received on slide bracket 250. For instance, storage drawer 142 may be slidably received below bottommost shelf 248. Weight sensor 210 may be mounted above storage drawer 142. Optionally, at least one weight sensor 210 may be centrally mounted between first panel side 234 and second panel side 236. Advantageously, weight sensor 210 may detect a mass load across multiple discrete shelves 224 (e.g., proximal to opposite panel sides) and held by slide bracket 250 (e.g., at bottommost shelf 248). Additionally or alternatively, one or more additional weight sensors 210 may be disposed proximal to first panel side 234 or second panel side 236, as would be understood. Thus, one weight sensor 210 may be mounted proximal to first panel side 234 (i.e., distal to second panel side 236) while another weight sensor 210 is mounted proximal to second panel side 236 (i.e., distal to first panel side 234). Both or all weight sensors 210 may be mounted at a common height or plane on support panel 212 (e.g., beneath bottommost shelf 248).

Returning generally to FIGS. 2 through 7, in certain embodiments, image module 160 and controller 150 are configured to capture one or more two-dimensional images. Optionally, multiple, sequential, two-dimensional images may be captured (e.g., at a predetermined rate or pattern) as part of an image capture sequence. Sequential images (e.g., a previously-captured image and a more-recently-captured image) may be recorded (e.g., temporarily) and compared at the controller 150. From the comparison, changes or differences between sequential images may be detected. Optionally, the image capture sequence may subsequently be stopped or halted according to one or more end conditions, such as expiration of a predetermined time period, failure to detect further changes in sequential images, or closing of the door 128.

Separate from or in addition to the captured images, weight sensor 210 and controller 150 may be configured to detect the mass or weight of objects on the shelves 224 or drawers 142 of shelf assembly 200 (e.g., according to a predetermined scheduled or in tandem with the image capture sequence). Such detections may generate a captured mass load.

From the captured images and mass load(s), controller 150 may automatically attempt to recognize items (e.g., stored items, such as food, or non-stored items such as a user appendage, a shelf, a movable drawer, etc.) within the field of view for the image module 160. As is understood, recognizing such items, may be performed by edge matching, divide-and-conquer search, greyscale matching, histograms of receptive field responses, or another suitable routine (e.g., executed at the controller 150 based on one or more captured images from image module 160). recognition may include or attempt to estimate the identification (e.g., what type of food or object is recognized) or quantity (e.g., number of discrete units, volume, or mass) of the stored item.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A refrigerator appliance comprising:
    a cabinet defining a chilled chamber;
    a door being rotatably hinged to the cabinet to provide selective access to the chilled chamber;
    an image module mounted to the cabinet; and
    a shelf assembly disposed below the image module within the chilled chamber, the shelf assembly comprising
        a support panel attached to the cabinet,
        a first shelf attached to the support panel,
        a second shelf attached to the support panel and spaced apart from the first shelf,
        a weight sensor mounted on the support panel to detect stored mass at the first shelf and the second shelf,
        a slide bracket mounted to the support panel, and
        a storage drawer slidably received on the slide bracket,
        wherein the weight sensor is mounted above storage drawer to further detect storage mass held by the slide bracket.

2. The refrigerator appliance of claim 1, wherein the weight sensor is disposed below the first shelf and the second shelf.

3. The refrigerator appliance of claim 1, wherein the support panel is disposed rearward from the first shelf and the second shelf at a rear portion of the chilled chamber.

4. The refrigerator appliance of claim 1, further comprising a plurality of mounting rails secured to the support panel to selectively attach the first shelf or the second shelf, wherein the plurality of mounting rails define a plurality of discrete heights at which the first shelf or the second shelf may be attached.

5. The refrigerator appliance of claim 1, wherein the support panel extends laterally between a first panel side and a second panel side, and wherein the weight sensor is centrally mounted between the first panel side and the second panel side.

6. The refrigerator appliance of claim 1, wherein the support panel extends laterally between a first panel side and a second panel side, wherein the weight sensor is a first weight sensor mounted proximal to the first panel side, and wherein the shelf assembly further comprises a second weight sensor mounted on the support panel proximal to the second panel side.

7. The refrigerator appliance of claim 1, wherein the first shelf is vertically spaced apart from the second shelf.

8. The refrigerator appliance of claim 1, wherein the first shelf is laterally spaced apart from the second shelf.

9. A refrigerator appliance comprising:
    a cabinet defining a chilled chamber;
    a door being rotatably hinged to the cabinet to provide selective access to the chilled chamber;
    an image module mounted to the cabinet; and
    a shelf assembly disposed below the image module within the chilled chamber, the shelf assembly comprising
        a support panel attached to the cabinet,
        a first shelf attached to the support panel,
        a second shelf attached to the support panel and vertically spaced apart from the first shelf, a weight sensor mounted on the support panel rearward from the first shelf and the second shelf at a rear portion of the chilled chamber to detect stored mass at the first shelf and the second shelf, a slide bracket mounted to the support panel, and a storage drawer slidably received on the slide bracket, wherein the weight sensor is mounted above storage drawer to further detect storage mass held by the slide bracket.

10. The refrigerator appliance of claim 9, wherein the weight sensor is disposed below the first shelf and the second shelf.

11. The refrigerator appliance of claim 9, further comprising a plurality of mounting rails secured to the support panel to selectively attach the first shelf or the second shelf, wherein the plurality of mounting rails define a plurality of discrete heights at which the first shelf or the second shelf may be attached.

12. The refrigerator appliance of claim 9, wherein the support panel extends laterally between a first panel side and a second panel side, and wherein the weight sensor is centrally mounted between the first panel side and the second panel side.

13. The refrigerator appliance of claim 9, wherein the support panel extends laterally between a first panel side and a second panel side, wherein the weight sensor is a first weight sensor mounted proximal to the first panel side, and wherein the shelf assembly further comprises a second weight sensor mounted on the support panel proximal to the second panel side.

14. The refrigerator appliance of claim 9, wherein the first shelf is laterally spaced apart from the second shelf.

15. A refrigerator appliance comprising:
a cabinet defining a chilled chamber;
a door being rotatably hinged to the cabinet to provide selective access to the chilled chamber;
an image module mounted to the cabinet; and
a shelf assembly disposed within the chilled chamber, the shelf assembly comprising
a support panel attached to the cabinet,
a first shelf attached to the support panel, a second shelf attached to the support panel,
a slide bracket mounted to the support panel,
a storage drawer slidably received on the slide bracket below the first shelf along a vertical direction, and
a weight sensor mounted on the support panel between the first shelf and a bottom end of the storage drawer relative to the vertical direction to detect stored mass at the first shelf, the second shelf, and the slide bracket.

16. The refrigerator appliance of claim 15, wherein the second shelf is spaced apart from the first shelf above the weight sensor and the storage drawer.

17. The refrigerator appliance of claim 16, further comprising a plurality of mounting rails secured to the support panel to selectively attach the first shelf or the second shelf, wherein the plurality of mounting rails define a plurality of discrete heights at which the first shelf or the second shelf may be attached.

18. The refrigerator appliance of claim 16, wherein the support panel extends laterally between a first panel side and a second panel side, and wherein the weight sensor is centrally mounted between the first panel side and the second panel side.

19. The refrigerator appliance of claim 16, wherein the support panel extends laterally between a first panel side and a second panel side, wherein the weight sensor is a first weight sensor mounted proximal to the first panel side, and wherein the shelf assembly further comprises a second weight sensor mounted on the support panel proximal to the second panel side.

20. The refrigerator appliance of claim 16, wherein the first shelf is laterally or vertically spaced apart from the second shelf.

* * * * *